United States Patent
Fredlund et al.

(10) Patent No.: US 6,724,427 B1
(45) Date of Patent: Apr. 20, 2004

(54) DRIVING A MEMORY DISPLAY IN AN IMAGE MEMORY CARD

(75) Inventors: John R. Fredlund, Rochester, NY (US); Raymond E. Wess, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 757 days.

(21) Appl. No.: 09/597,134

(22) Filed: Jun. 20, 2000

(51) Int. Cl.⁷ .............................................. H04N 5/222
(52) U.S. Cl. ......................... 348/333.07; 348/231.99; 348/371
(58) Field of Search ................. 348/207.99, 231.99, 348/231.3, 231.7, 231.9, 333.01, 333.06, 333.07, 333.12, 333.13, 373, 375, 370, 371; 396/313; 349/106; 252/299.01

(56) References Cited

U.S. PATENT DOCUMENTS

| | | | |
|---|---|---|---|
| 4,837,817 A | * 6/1989 | Maemori | 348/211.4 |
| 4,887,161 A | * 12/1989 | Watanabe et al. | 348/231.7 |
| 5,695,682 A | 12/1997 | Doane et al. | |
| 5,790,193 A | * 8/1998 | Ohmori | 348/375 |
| 5,912,716 A | 6/1999 | Stephenson | |
| 6,025,952 A | 2/2000 | Stephenson | |
| 6,038,406 A | * 3/2000 | Xie et al. | 396/313 |

* cited by examiner

*Primary Examiner*—Tuan Ho
(74) *Attorney, Agent, or Firm*—Raymond L. Owens (57) ABSTRACT

A camera having a removable image bearing medium and an electronic charging unit for providing a source of high voltage, includes a display on the removable image bearing medium. The camera selectively couples such high voltage to the display, the display including material which is effective in a first condition in response to a selectively applied high voltage for changing the condition of the material to display an image and effective in a second condition for preventing the display of the image, the material being selected so that after displaying the image such material continues to display the image after the removal of the applied high voltage. The camera further causes the high voltage in the charging unit to be applied to the display for causing the material to be effective in the first condition to produce the image and for removing the applied high voltage so that the material continues to display the image. When a voltage less than the high voltage is applied to the display, the material changes to the second condition.

13 Claims, 7 Drawing Sheets

DRIVING A MEMORY DISPLAY IN AN IMAGE MEMORY CARD

CROSS REFERENCE TO RELATED APPLICATION

Reference is made to commonly-assigned U.S. patent application Ser. No. 09/045,016 filed Mar. 20, 1998, U.S. Pat. No. 6,262,697 entitled "Display Having Viewable and Conductive Images" by Stanley W. Stephenson, the disclosure of which is incorporated herein by reference.

FIELD OF THE INVENTION

The present invention relates to cameras having removable image bearing media.

BACKGROUND OF THE INVENTION

Current silver halide film cameras have displays for indicating settings and status conditions, such as frame number, of the camera. Often, the display uses twisted nematic liquid crystals that that requires continuous electrical drive to display information. Cameras with this type of display can be turned on only for short periods of time to preserve battery life. When the cameras are turned off, the liquid crystal display goes blank. An operator must turn on the camera to determine the status of the camera. These cameras typically incorporate a high voltage supply to drive an electronic flash built into the camera, and utilize cartridges that contain the film in a light tight environment.

Many digital cameras use liquid crystal displays to display a captured image. Displays in these cameras are also nematic liquid crystals displays that can drain an electronic camera high voltage supply in a short period of time.

Many digital cameras also use removable memory cards to store images. There is no way to tell how much capacity remains or what images reside on these memory cards.

SUMMARY OF THE INVENTION

Accordingly, it is an object of the present invention to provide a display on image bearing medium.

It is another object of the present invention to provide a display on image bearing medium that presents an image to a viewer even when the voltage to the display is removed.

These objects are achieved in a camera having a removable image bearing medium and an electronic flash charging unit for providing a source of high voltage, comprising:

(a) a display on the removable image bearing medium;

(b) means for selectively coupling such high voltage to the display, the display including material which is effective in a first condition in response to a selectively applied high voltage for changing the condition of the material to display an image and effective in a second condition for preventing the display of the image, the material being selected so that after displaying the image such material continues to display the image after the removal of the applied high voltage; and (c) voltage applying means for causing the coupling means to selectively apply the high voltage in the charging unit to the display for causing the material to be effective in the first condition to produce the image and for removing the applied high voltage so that the material continues to display the image, the voltage applying means selectively applying a voltage less than the high voltage for causing the material to be effective in the second condition.

An advantage of the present invention is that it permits the use of displays which require a high voltage source to display images.

A feature of the present invention is that the high voltage supply in the electronic flash unit can be used as a source of high voltage for the display on the image bearing medium.

It is a feature of the present invention it permits display of images on the image bearing medium when high voltage to the display is turned off.

It is a further feature of the present invention to provide an indication on the image bearing medium of the storage capacity remaining.

DETAILED DESCRIPTION OF THE INVENTION

Figure 1:
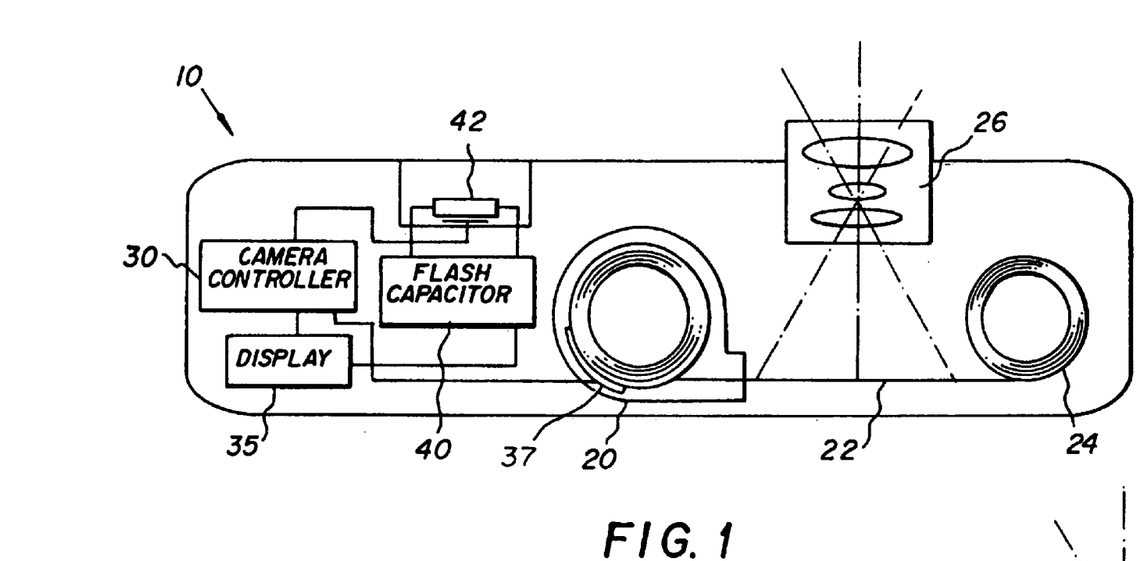
FIG. 1 is a top sectional view of a silver halide camera with a film cartridge with a memory display.

A top sectional view of a silver halide film camera 10 is shown in FIG. 1. A film cassette 20 with a memory display 37 in camera 10 holds a strip of film 22 that captures images from optic 26. Film 22 is sequentially taken up onto take-up spool 24 to capture a set of images. After image exposure is complete, film 22 is returned to film cassette 20. Camera controller 30 receives commands from an operator and controls the sequential motion of film 22 and optic 26. Camera controller 30 can provide supplemental illumination to a scene by discharging a high voltage pulse through flash tube 42 in a flash unit. Flash tube 42 requires a flash capacitor 40 to store energy for flash tube 42. Flash capacitor 40 typically stores energy in a capacitor having over 50 micro-farads capacitance at over 100 volts.

The status of camera 10 is shown on a display 35 in camera 10. Typically, display 35 shows the number of the current frame of film, the operational mode of flash tube 42, and operating parameters of optic 26. In more complex cameras, display 35 is a conventional nematic liquid crystal display. Nematic liquid crystal fluids act in conjunction with polarizing filters to act as a shutter to reflect or transmit light. Transmitted light is selectively reflected from a surface behind the display to provide light indicia. The reflected light provides a white indicia. When light is blocked by the polarizing filters, the imager area is dark. Nematic liquid crystals must have a continuous electrical field across the display to display information.

Figure 2:
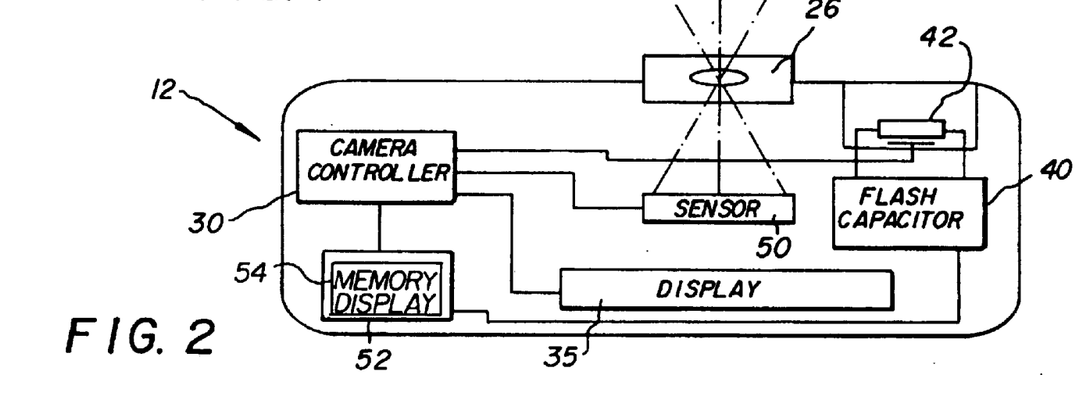
FIG. 2 is a top sectional view of an electronic capture camera with a removable memory card with a memory display.

FIG. 2 is a top sectional view of an electronic camera 12. Many of the components operate as in conventional camera 10. Film 22 is replaced by electronic sensor 50. Electronic sensor 50 captures a scene and camera controller 30 stores a captured image in removable memory card 52 with memory display 54. Display 35 in electronic camera 12 displays the status of electronic camera 12, and in certain cases displays images from memory 52. The flash tube 42 is often provided in electronic camera 12 to supply additional light to a scene at the time of image capture. Flash tube 42 requires the flash capacitor 40 to store energy for flash tube 42. Flash capacitor 40 typically stores energy in a capacitor having over 50 micro-farads capacitance at over 100 volts.

Figure 3:
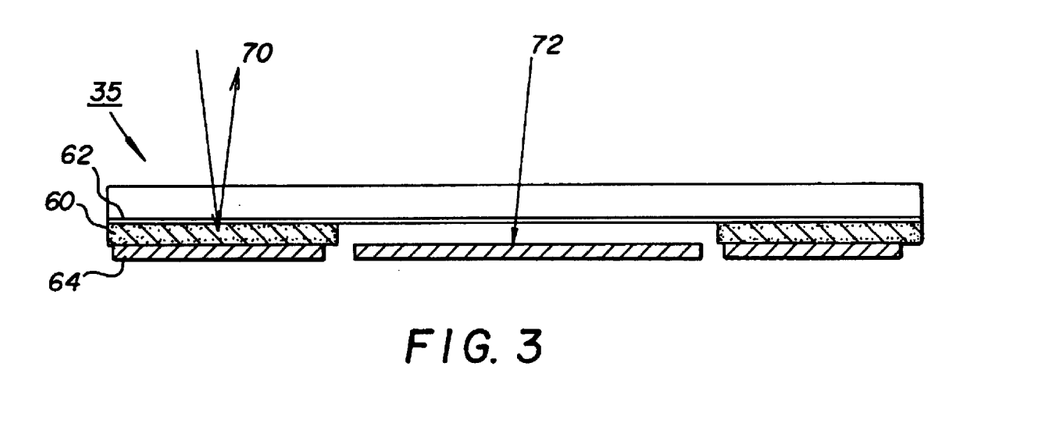
FIG. 3 is a side sectional view of the memory display of FIG. 1.

FIG. 3 is a diagram of display 35 in accordance with the present invention. Memory material 60 is disposed between a transparent top conductor 62 and a bottom conductor 64. Bottom conductor 64 can be a transparent electrical conductor such as Indium-Tin-Oxide or a light absorbing conductor formed by an oxide of a metal such as platinum or nickel. Memory material 60 can be a chiral doped nematic liquid crystal such as those disclosed in U.S. Pat. No. 5,695,682. Applied fields of various intensity and duration change the condition of chiral doped nematic materials from a reflective to a transmissive condition. These materials have the advantage of maintaining a given condition indefinitely after the field is removed. Ambient light striking memory material can be reflected light 70, providing a "light" image or can become absorbed light 72 which provides a "dark" image. The light modulation is effective in two conditions, which will be described in more detail below. Cholesteric liquid crystal materials can be Merck BL112, BL118 or BL126 which are available from EM Industries of Hawthorne, N.Y. In one experiment, two glass plates were coated with transparent Indium-Tin-Oxide (ITO) to form transparent top conductor 62 and bottom conductor 64. A laser beam was used to pattern the ITO coatings and 4 micron spacer beads were applied to one of the plates. The two plates were bonded together, with the spacer beads providing a 4 micron gap between the two plates. Black paint was applied to the back of the display over bottom conductor 64 to absorb light passing through memory material 60. The gap between the plates was filled with E. M. Industries (Hawthorne, N.Y.) chiral nematic fluid BL126 to act as memory material 60. A 3 millisecond pulse at 100 volts across areas on transparent top conductor 62 and bottom conductor 64 would convert the BL126 memory material 60 to a reflective "bright" areas. A 3 millisecond pulse at 40 volts would clear memory material 60 so that incident light was absorbed by the black paint and create "dark" areas. Such a display can be used to display camera status on memory display 37 for conventional camera 10 or display 54 for electronic camera 12. The memory display 37 includes the memory material 60 which is selected to be effective in a first condition for changing the state of the memory material 60 to display an image and effective in a second condition for preventing the display of the image. The memory material 60 is selected so that after displaying the image the memory material 60 continues to display the image after the removal of the applied high voltage. As will be seen shortly when a voltage less than the high voltage is applied to the memory material 60, the memory material 60 is caused to be in its second condition.

Figure 4:
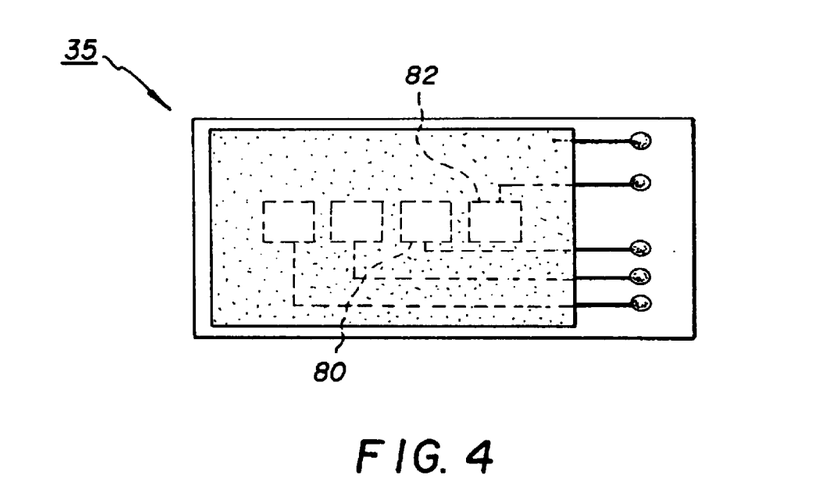
FIG. 4 is a top view of the memory display of FIG. 3.

FIG. 4 shows such display 35 having memory material 60. A reflecting segment 80 has had a 100 volt pulse applied to memory material 60. A transparent segment 82 has received a 40 volt pulse. Transparent segment 82 passes incident light to a light absorbing surface to create a dark. The individual segments retain a given condition indefinitely after being pulsed. A camera with an electronic flash charging unit provides the source of high voltage. As will be discussed in FIG. 5 a camera 10 or 12 with an electronic flash charging unit provides the source of high voltage that can be shut off and the image-bearing medium will continue to have an visible display.

Figure 5:
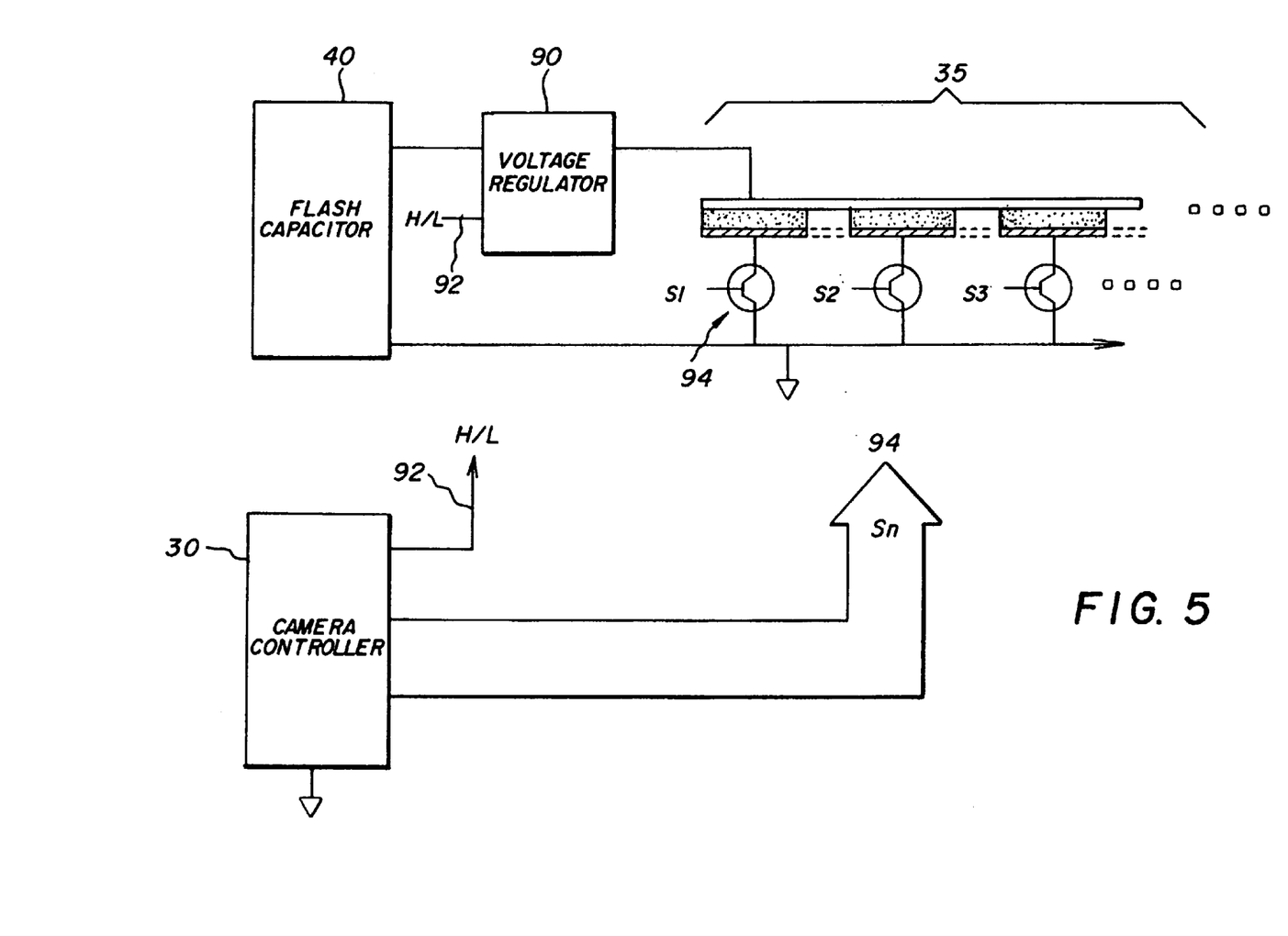
FIG. 5 shows an electrical circuit which drives the display of FIG. 3 by selectively coupling the flash unit high voltage supply to the display.

FIG. 5 is a schematic for driving memory display 37 in conventional camera 10. Flash capacitor 40 is used as a source of high voltage for pulsing memory display 37. Flash capacitor 40 stores power at well over 100 volts. Voltage regulator 90 converts a voltage from flash capacitor 40 to either a high or low voltage. In one case, voltage regulator 90 is resistor network that changes 330 volts on flash capacitor 40 to either 100 or 40 volts in response to high-low voltage select line 92 which is used by camera controller 30 to select a pulse voltage for memory display 37. Using the pre-existing high voltage on flash capacitor 40 eliminates the need for an additional high voltage generating system in conventional camera 10.

Camera controller 30 uses high-low voltage select line 92 to changes the voltage applied to memory display 37. Memory display 37 contains chiral nematic liquid crystal memory material 60 to hold either a reflective or transmissive condition for each segment of display 37.

Figure 8A:
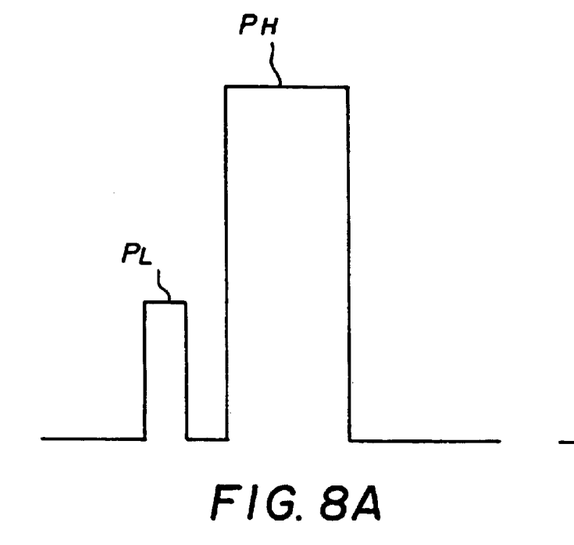
FIG. 8A is a waveform to drives a memory material to a reflecting, or bright condition.

FIG. 8A show the voltage forms applied by camera controller 30 to a segment of memory display 37 to write the segment into the reflective mode. Camera controller 30 sets voltage regulator 90 to a low voltage and pulses all segment switches 94 to clear all the segments with low voltage pulse $P_L$. Voltage regulator 90 is then set to a high voltage, and selected ones of segment drivers 94 are pulsed with a high voltage pulse $P_H$ to convert those segments to the reflective mode.

Figure 8B:
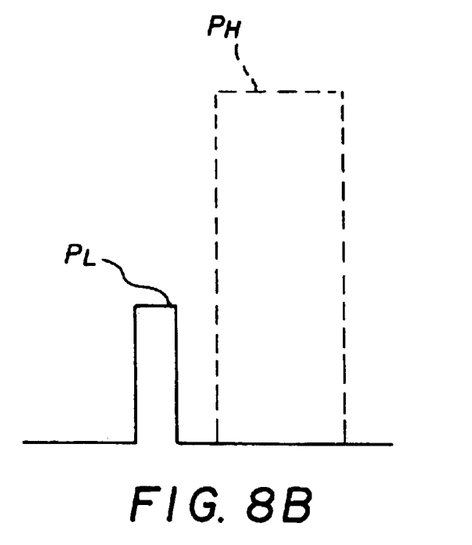
FIG. 8B is a waveform to drives a memory material to a transmitting, or dark condition.

FIG. 8B is waveform across a segment that has been kept in the transmissive mode. Because $P_H$ was not applied across that segment, the segment remains in a transmissive, dark condition from $P_L$. After the write pulses $P_L$ and $P_H$ are applied, memory display 37 will continue to display status information indefinitely without the use of additional power. Conventional camera 10 can be de-energized and memory display 37 will continue to display information such as the number of images left on film 22 or dates of exposure of frames on film 22 or other information pertinent to images on film 22. If film camera 10 was a hybrid camera with the capacity to capture electronic images as well as film images, a representation of the at least one image electronically captured could also be displayed on memory display 37 on film cassette 20.

Figure 6A:
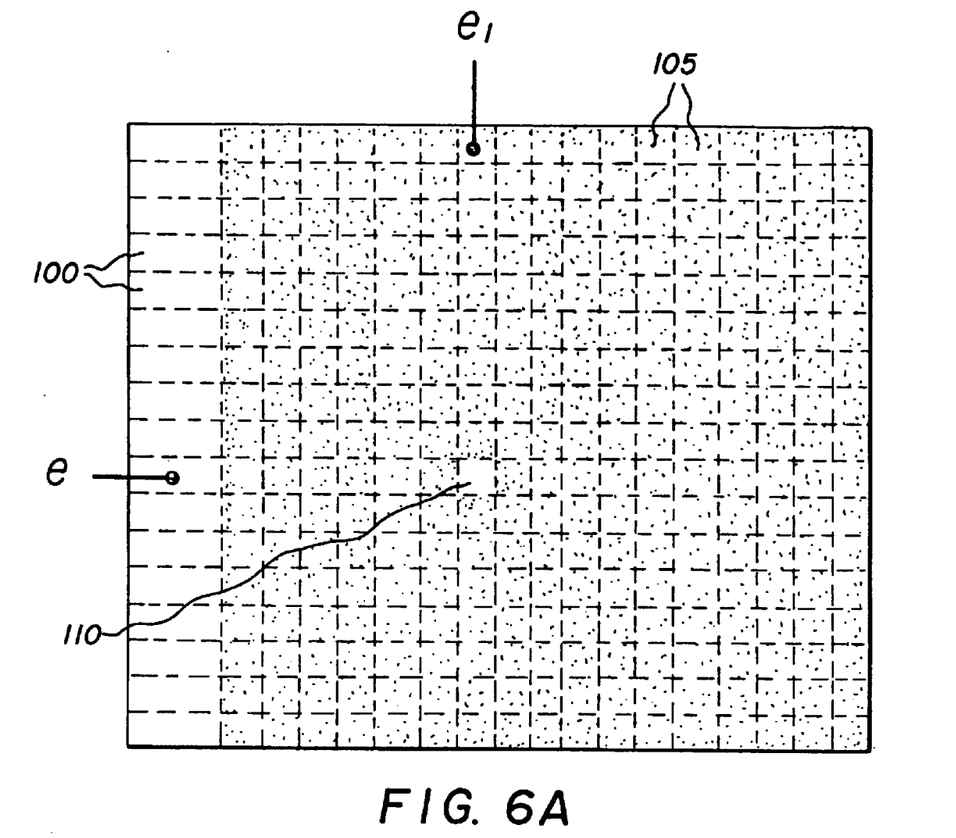
FIG. 6 is a partial top view of the memory display of the electronic capture camera of FIG. 2.
Figure 6B:
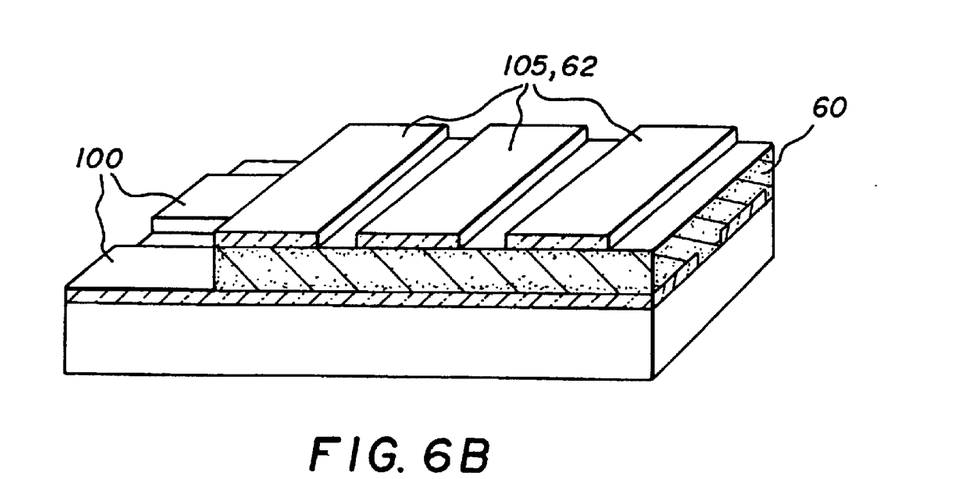
FIG. 6B is a magnified view of the memory display of FIG. 6A.

FIG. 6A is a partial top view and FIG. 6B is a magnified view of display 35 in electronic capture camera 12. A substrate 61 supports a plurality of transparent row traces 100. A second set of transparent traces form column traces 105. These traces provide for electrical conduction to the display 35 and coupled selectively the high voltage in the flash unit and the low voltage to the display as discussed above. The memory material 60 is disposed between row traces 100 and column traces 105. Memory material 60 is a chiral nematic material that can be written into either a reflective or transmissive condition. Chiral nematic materials can be tuned to red green and blue wavelengths of reflection and three color planes can be stacked to create a full color display.

Figure 7:
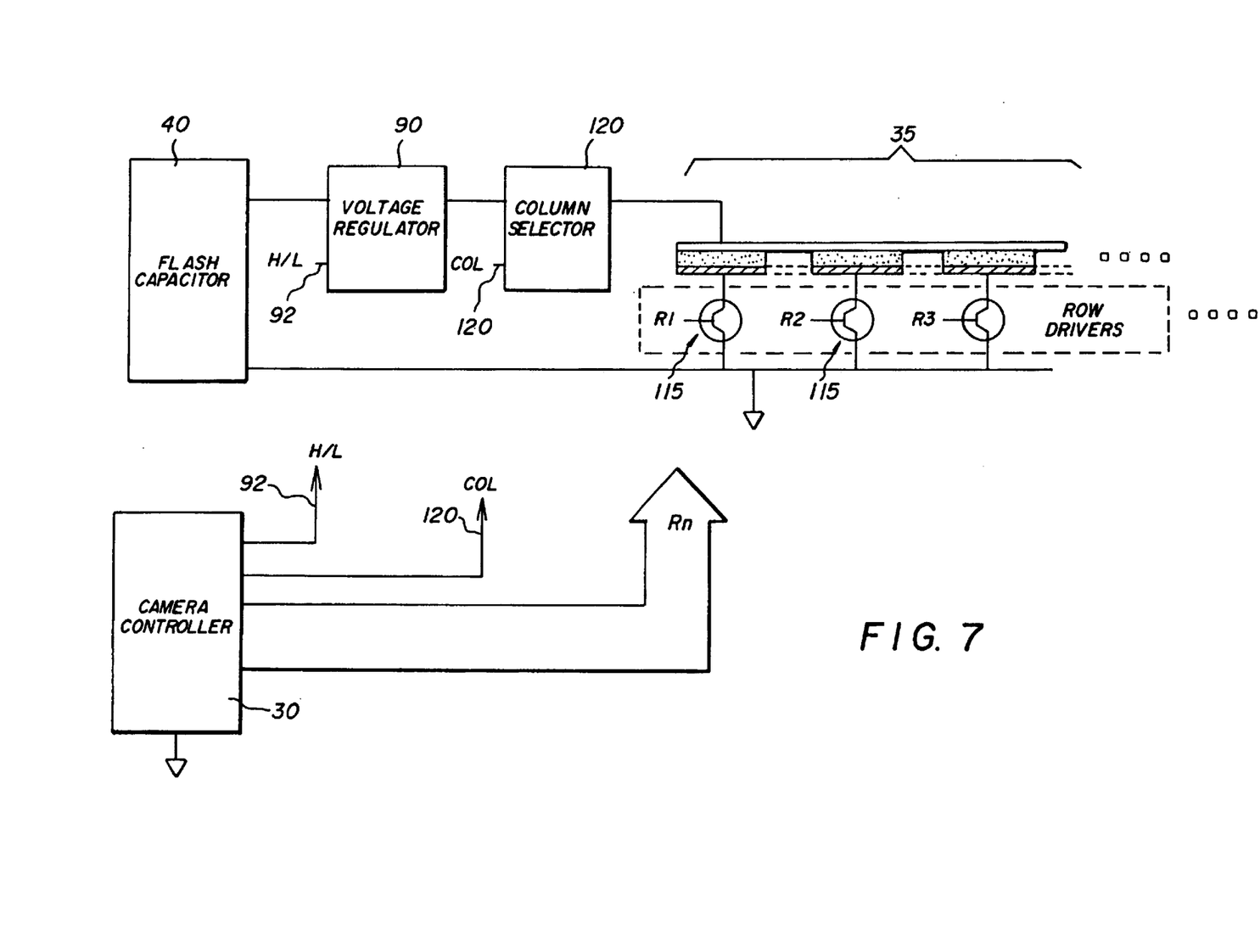
FIG. 7 is an electrical schematic circuit which drives the memory display of FIGS. 6A and 6B.

FIG. 7 is a schematic for driving display 54 in an electronic camera 12. Flash capacitor 40 is used as a source of high voltage for pulses to display 35. Flash capacitor 40 stores power at well over 100 volts. Voltage regulator 90 converts a voltage from flash capacitor 40 to either a high or low voltage. In one case, voltage regulator 90 is resistor network that changes 330 volts on flash capacitor 40 to either 100 or 40 volts in response to high-low voltage select line 92. Using the pre-existing high voltage on flash capacitor 40 eliminates the need for a high voltage generating system in electronic camera 12.

Figure 8C:
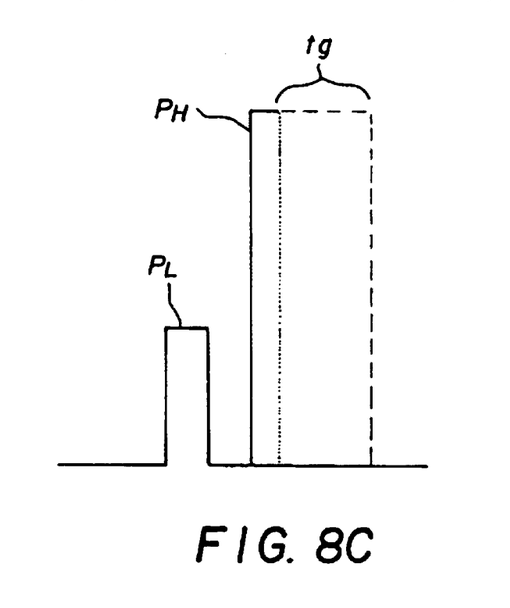
FIG. 8C is a waveform to drive a memory material to an intermediate condition between transmission and reflection.

FIG. 8C is the drive signals applied across a single color plane of display 35 when used as to display a color, gray scale image stored in memory 52 using the electrical drive of FIG. 7. Camera controller 30 selects a first column using column selector 120. Camera controller 30 sets voltage regulator 90 to a low voltage, and row drivers 115 write a first clearing pulse $P_L$ to all pixels in the row. Camera controller 30 then sets voltage regulator 90 to a high voltage. Row drivers 115 are energized for various gray level times tg A chiral nematic material changes condition from the transmissive to the reflective condition progressively over time. By selecting an appropriate drive time tg for each pixel 110, a column of pixels can be written to various degrees of reflection, creating a column of pixels written to various gray levels. Camera controller 30 uses to column selector 120 to select the next column of pixels for writing. The process is repeated for each column, and each color plane to create a full-color, gray scale image on display 35. Other driving schemes can be used such as one proposed by Hashimoto et al, "Reflective Color Display Using Cholesteric Liquid Crystals", SID 98 Digest, Article 31.1, 1998, pp. 897–900.

Figure 9:
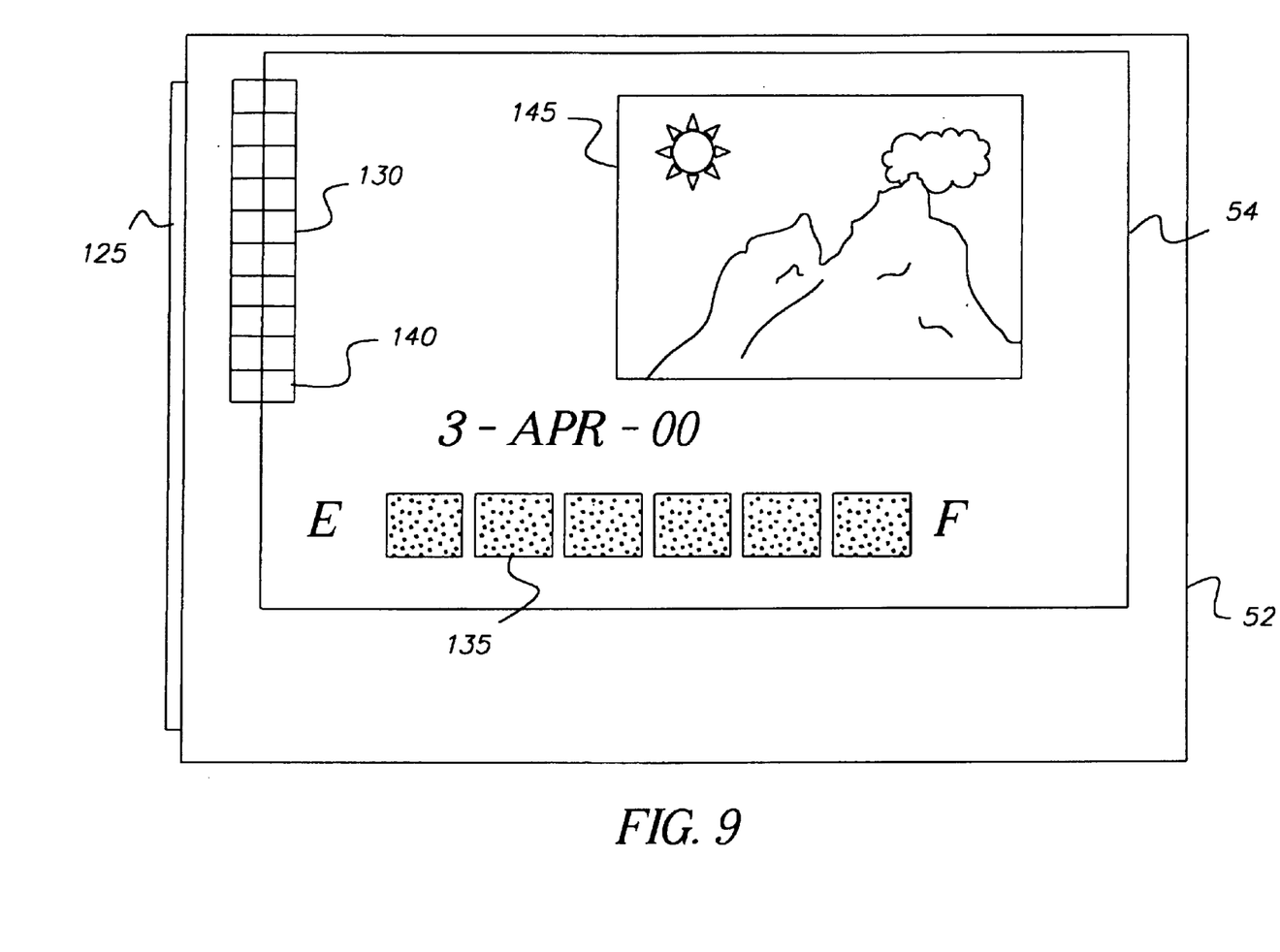
FIG. 9 is a view of a memory card with a memory display.

FIG. 9 is a view of a memory card 52 with a memory display 54. Connector 125 mates with the electronic camera 12 to transfer image data for storage as is traditional in electronic cameras. Connector 130 is provided so that the high voltages necessary to update memory display 54 may be applied. One skilled in the art will understand that it may also be possible to update both the memory card and the memory display using a single connector.

Bar indicator 135 is a display that indicates the remaining storage space on the memory card. Time or date display 140 is an indication of the date of capture of at least one of the images stored on the card. Image display 145 is a representation of at least one image file stored on the card. Image display 145 may be imagettes of many image files stored on the card, or could be a portion of one image.

The invention has been described in detail with particular reference to certain preferred embodiments thereof, but it will be understood that variations and modifications can be effected within the spirit and scope of the invention.

PARTS LIST 10 conventional camera
12 electronic camera
20 film cassette
22 film
24 take-up spool
26 optic
30 camera controller
35 display
37 memory display
40 flash capacitor
42 flash tube
50 sensor
52 removable memory card
54 memory display
60 memory material
61 substrate
62 transparent top conductor
64 bottom conductor
70 reflected light
72 absorbed light
80 reflecting segment
82 transmitting segment
90 voltage regulator
92 high-low voltage select line
94 segment switch
100 row traces
105 column traces Parts List cont'd 110 pixel
115 row drivers
120 column selector
125 memory card connector
130 memory display connector
135 bar indicator
140 time or date indicator
145 image display area

What is claimed is:

1. A camera having a removable image bearing medium and an electronic charging unit for providing a source of high voltage, comprising:

(a) a display on the removable image bearing medium;

(b) means for selectively coupling such high voltage to the display, the display including material which is effective in a first condition in response to a selectively applied high voltage for changing the condition of the material to display an image and effective in a second condition for preventing the display of the image, the material being selected so that after displaying the image such material continues to display the image after the removal of the applied high voltage; and (c) voltage applying means for causing the coupling means to selectively apply the high voltage in the charging unit to the display for causing the material to be effective in the first condition to produce the image and for removing the applied high voltage so that the material continues to display the image, the voltage applying means selectively applying a voltage less than the high voltage for causing the material to be effective in the second condition.

2. The camera of claim 1 wherein the material includes a chiral nematic liquid crystal.

3. The camera of claim 1 wherein the image bearing medium includes film in a film cartridge.

4. The camera of claim 1 wherein the image bearing medium includes a memory card.

5. The camera of claim 1 wherein the image bearing medium displays an indication of remaining capacity of images to be taken by the camera.

6. The camera of claim 1 wherein the image bearing medium displays a time or date.

7. The camera of claim 1 wherein the image bearing medium displays at least one image representative of the images captured by the camera.

8. The camera of claim 1 wherein the display includes:
(i) a substrate; and
(ii) the memory material formed over the substrate; and
(iii) electrical conduction means connected to the display for coupling and selectively applying the high voltage in the charging unit and the low voltage to the display for changing the condition of the material in the display.

9. The camera of claim 8 wherein the electrical conduction means includes a plurality of overlapping row and column traces which intersect at pixel positions and wherein the high voltage is selectively applied to such pixel positions.

10. The camera of claim 8 wherein the electrical conduction means applies a pulses of high voltage to the display to cause it to be effective in the first condition and to remain in such condition until pulses of lower voltage are applied.

11. The camera of claim 8 wherein the image bearing medium is a film cartridge.

12. The camera of claim 8 wherein the image bearing medium is a memory card.

13. The camera of claim 8 wherein the image bearing medium displays an indication of remaining capacity.

* * * * *